United States Patent
Wu

(10) Patent No.: US 12,101,653 B2
(45) Date of Patent: Sep. 24, 2024

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventor: Zuomin Wu, Dongguan (CN)

(73) Assignee: GUANGDONG OPPO MOBILE TELECOMMUNICATION CORP., LTD., Dongguan (CN)

( * ) Notice: Subject to any disclaimer, the term of this patent is extended or adjusted under 35 U.S.C. 154(b) by 202 days.

(21) Appl. No.: 17/458,522

(22) Filed: Aug. 26, 2021

(65) Prior Publication Data

US 2021/0392532 A1 Dec. 16, 2021

Related U.S. Application Data

(63) Continuation of application No. PCT/CN2019/079147, filed on Mar. 21, 2019.

(51) Int. Cl.
*H04W 24/08* (2009.01)
*H04B 7/06* (2006.01)
(Continued)

(52) U.S. Cl.
CPC .......... *H04W 24/08* (2013.01); *H04B 7/0626* (2013.01); *H04L 5/0048* (2013.01);
(Continued)

(58) Field of Classification Search
CPC ..... H04W 24/08; H04W 16/14; H04W 24/02; H04W 72/044; H04W 72/23;
(Continued)

(56) References Cited

U.S. PATENT DOCUMENTS

| | | | |
|---|---|---|---|
| 11,711,713 B2* | 7/2023 | Babaei | H04W 24/10 370/329 |
| 2013/0077514 A1* | 3/2013 | Dinan | H04W 24/10 370/252 |

(Continued)

FOREIGN PATENT DOCUMENTS

| | | |
|---|---|---|
| CN | 108601084 A | 9/2018 |
| CN | 109413691 A | 3/2019 |

(Continued)

OTHER PUBLICATIONS

International Search Report issued in corresponding International Application No. PCT/CN2019/079147, mailed Aug. 9, 2019, 31 pages.

(Continued)

*Primary Examiner* — Hoang-Chuong Q Vu
(74) *Attorney, Agent, or Firm* — BAYES PLLC

(57) ABSTRACT

Disclosed in embodiments of the present disclosure are a wireless communication method, a terminal device and a network device. The method includes that the terminal device receives configuration information of a first resource from the network device and the terminal device determines the first resource on a first bandwidth part (BWP) according to the configuration information. The first resource includes a channel state information reference signal CSI-RS resource and/or a channel state information interference measurement CSI-IM resource. The first BWP is a BWP on an unlicensed carrier, and the first BWP includes at least two subbands in a frequency domain.

12 Claims, 5 Drawing Sheets

(51) Int. Cl.
  *H04L 5/00* (2006.01)
  *H04W 16/14* (2009.01)
  *H04W 24/02* (2009.01)
  *H04W 72/04* (2023.01)
  *H04W 72/044* (2023.01)
  *H04W 72/0457* (2023.01)

(52) U.S. Cl.
  CPC .......... *H04W 16/14* (2013.01); *H04W 24/02* (2013.01); *H04W 72/044* (2013.01); *H04W 72/0457* (2023.01)

(58) Field of Classification Search
  CPC .. H04W 72/0453; H04L 5/0048; H04L 5/001; H04L 5/0094; H04L 27/0006; H04B 7/0626; H04B 17/309
  See application file for complete search history.

(56) References Cited

U.S. PATENT DOCUMENTS

| | | | | |
|---|---|---|---|---|
| 2015/0319636 | A1* | 11/2015 | Lee | H04B 17/345 370/252 |
| 2016/0323901 | A1* | 11/2016 | Yum | H04W 72/542 |
| 2017/0202014 | A1* | 7/2017 | Moon | H04B 7/0626 |
| 2018/0103433 | A1* | 4/2018 | Li | H04W 52/146 |
| 2018/0279149 | A1* | 9/2018 | Li | H04L 5/0091 |
| 2019/0089437 | A1* | 3/2019 | Chen | H04B 7/0617 |
| 2019/0149306 | A1* | 5/2019 | Gao | H04L 1/0026 370/252 |
| 2019/0173644 | A1* | 6/2019 | Lyu | H04W 24/08 |
| 2019/0357192 | A1* | 11/2019 | Gong | H04W 72/044 |
| 2020/0112484 | A1* | 4/2020 | Sun | H04L 5/003 |
| 2020/0260442 | A1* | 8/2020 | Yi | H04W 72/23 |
| 2021/0120442 | A1* | 4/2021 | Hao | H04W 24/10 |
| 2021/0227568 | A1* | 7/2021 | Harada | H04L 5/0048 |
| 2021/0410186 | A1* | 12/2021 | Hajir | H04W 74/0816 |
| 2022/0014337 | A1 | 1/2022 | Ouchi et al. | |
| 2023/0239848 | A1* | 7/2023 | Tooher | H04W 72/0446 370/329 |

FOREIGN PATENT DOCUMENTS

| | | |
|---|---|---|
| CN | 109428697 A | 3/2019 |
| CN | 109451864 A | 3/2019 |
| EP | 3442304 A1 | 2/2019 |
| EP | 3855793 A1 | 7/2021 |
| EP | 3858023 A1 | 8/2021 |
| WO | 2017000099 A1 | 1/2017 |
| WO | 2018082016 A1 | 5/2018 |
| WO | 2018126764 A1 | 7/2018 |
| WO | 2019017753 A1 | 1/2019 |
| WO | 2019029536 A1 | 2/2019 |

OTHER PUBLICATIONS

PCT Written Opinion of the International Searching Authority issued in corresponding International Application No. PCT/CN2019/079147, mailed Aug. 9, 2019, 8 pages.
"Initial access in NR unlicensed", Agenda Item: 7.2.2.4.2, Source: Huawei, HiSilicon, 3GPP TSG RAN WG1 Meeting #95, R1-1812195, Spokane, USA, Nov. 12-16, 2018, 10 pages.
Extended European Search Report issued in corresponding European Application No. 19920336.5, mailed Jan. 14. 2022, 11 pages.
Second Office Action issued in corresponding European application No. 19920336.5, mailed Mar. 22, 2023.
Second Office Action issued in corresponding Chinese application No. 202110874798.2, mailed Feb. 16, 2023.
First Office Action issued in corresponding European application No. 19920336.5, mailed Oct. 20, 2022.
First Office Action issued in corresponding Chinese application No. 202110874798.2, mailed Nov. 30, 2022.
Third Office Action issued in corresponding European application No. 19920336.5, mailed Aug. 23, 2023.
Notice of Allowance issued in corresponding Chinese application No. 202110874798.2, mailed Jun. 27, 2023.
Fourth Office Action issued in corresponding European application No. 19920336.5, mailed Feb. 28, 2024.
Non-Final Rejection issued in the U.S. Appl. No. 17/458,465, mailed Feb. 1, 2024.
Communication pursuant to Article 94(3) EPC issued in corresponding European Application No. 19 920 336.5, dated Jul. 29, 2024, 5 pages.

* cited by examiner

WIRELESS COMMUNICATION METHOD, TERMINAL DEVICE AND NETWORK DEVICE

CROSS-REFERENCE TO RELATED APPLICATION

This application is a continuation of International Application No. PCT/CN2019/079147, filed on Mar. 21, 2019, the entire contents of which are incorporated herein by reference.

BACKGROUND

The embodiments of the present disclosure relate to the field of communications, and more particularly, to a method of wireless communication, a terminal device, and a network device.

In the related art, a terminal device may improve high-speed service transmission and ensure quality of experience of a user by using manners such as feeding back channel state information (CSI) to a network device based on measurement of a channel state information reference signal (CSI-RS), or performing channel state information interference measurement (CSI-IM).

Since an unlicensed frequency spectrum is considered to be a shared frequency spectrum, if this part of spectrums can be effectively utilized, the communication performance will be greatly improved. Therefore, performing CSI-RS measurement and CSI-IM on the unlicensed frequency spectrum has also been researched. Currently, with the introduction of a bandwidth part (BWP), there is not yet a reference solution of how to obtain a resource for transmitting CSI-RS and/or a resource for performing CSI-IM on the BWP of the unlicensed carrier by a terminal device to perform CSI-RS measurement and CSI-IM.

SUMMARY

The embodiments of the present disclosure provide a method of wireless communication, a terminal device and a network device, which is beneficial to improving the communication performance.

In a first aspect, there is provided a method of wireless communication, including receiving, by a terminal device, configuration information of a first resource sent by a network device, where the first resource includes a channel state information reference signal (CSI-RS) resource and/or a channel state information interference measurement (CSI-IM) resource; and determining, by the terminal device, the first resource on a first bandwidth part (BWP) according to the configuration information, where the first BWP is a BWP on an unlicensed carrier, and the first BWP includes at least two subbands in a frequency domain.

Optionally, the first BWP may be a BWP configured for the terminal device.

Optionally, the first BWP may be an activated BWP in a plurality of BWPs configured for the terminal device.

Optionally, the first BWP is a downlink BWP.

In a second aspect, there is provided a method of wireless communication, including sending, by a network device, configuration information of a first resource to a terminal device, where the configuration information is used for determining the first resource on a first bandwidth part (BWP) by the terminal device, the first BWP is a BWP on an unlicensed carrier, the first BWP includes at least two subbands in a frequency domain, and the first resource includes a channel state information reference signal (CSI-RS) resource and/or a channel state information interference measurement (CSI-IM) resource.

In a third aspect, there is provided a method of wireless communication, including receiving, by a terminal device, configuration information of a Sounding Reference Signal (SRS) resource sent by a network device; and determining, by the terminal device, the SRS resource on a first bandwidth part (BWP) according to the configuration information, where the first BWP is a BWP on an unlicensed carrier, and the first BWP includes at least two subbands in a frequency domain.

Optionally, the first BWP is an uplink BWP.

In a possible implementation manner, the configuration information is used for indicating the SRS resource on the first BWP.

In a possible implementation manner, the configuration information is used for indicating the SRS resource on at least one subband included in the first BWP.

In a possible implementation manner, the configuration information includes a starting resource block (RB) of the SRS resource and a number of RB included in the SRS resource, on at least part of subband in the at least one subband included in the first BWP.

In a possible implementation manner, the configuration information includes N bit, the N bit has a corresponding relationship with a resource block (RB) group included in the first BWP, the N bit is used for indicating the SRS resource on the first BWP, and N is a positive integer.

In a possible implementation manner, the configuration information is used for indicating the SRS resource on at least one subband included in the unlicensed carrier, and the determining, by the terminal device, the SRS resource on the first bandwidth part (BWP) according to the configuration information, includes determining, by the terminal device, the SRS resource on the first BWP according to the configuration information and the subband included in the first BWP.

In a possible implementation manner, the configuration information includes a starting resource block (RB) of the SRS resource and a number of RB included in the SRS resource, on at least part of subband in the at least one subband included in the unlicensed carrier.

In a possible implementation manner, the configuration information includes K bit, the K bit has a corresponding relationship with a resource block (RB) group included in the unlicensed carrier, the K bit is used for indicating the SRS resource on the unlicensed carrier, and K is a positive integer.

In a possible implementation manner, the configuration information includes a starting resource block (RB) of the SRS resource and a number of RB included in the SRS resource on the first BWP.

In a possible implementation manner, the configuration information is used for determining that a resource, which is included in a guard band between two adjacent subbands in the at least two subbands, does not include the SRS resource.

In a possible implementation manner, the SRS resource occupies M frequency domain units on the first BWP, and at least two frequency domain units in the M frequency domain units are discontinuous, where M is a positive integer greater than 1.

In a possible implementation manner, the SRS resource is located on a first subband and a second subband in the at least two subbands, the M frequency domain units include M1 frequency domain unit and M2 frequency domain unit, the M1 frequency domain unit is located on the first subband, and the M2 frequency domain units located on the second subband, where M1 and M2 are positive integers respectively.

In a possible implementation manner, the M1 frequency domain unit is continuous, and the M2 frequency domain unit is continuous.

In a possible implementation manner, any two adjacent frequency domain units in the M1 frequency domain units are discontinuous, and any two adjacent frequency domain units in the M2 frequency domain units are discontinuous.

In a possible implementation manner, the method further includes sending, by the terminal device, first indication information to the network device, where the first indication information is used for determining a valid SRS resource in the SRS resource, and the valid SRS resource includes an SRS resource in the SRS resources that is on a subband and a symbol occupied by the terminal device.

In a fourth aspect, there is provided a method of wireless communication, including sending, by a network device, configuration information of an SRS resource to a terminal device, where the configuration information is used for determining the SRS resource on a first bandwidth part (BWP) by the terminal device, the first BWP is a BWP on an unlicensed carrier, the first BWP includes at least two subbands in a frequency domain.

In a possible implementation manner, the configuration information is used for indicating the SRS resource on the first BWP.

In a possible implementation manner, the configuration information is used for indicati ng the SRS resource on at least one subband included in the first BWP.

In a possible implementation manner, the configuration information includes a starting resource block (RB) of the SRS resource and a number of RB included in the SRS resource, on at least part of subband in the at least one subband included in the first BWP.

In a possible implementation manner, the configuration information includes N bit, the N bit has a corresponding relationship with a resource block (RB) group included in the first BWP, the N bit is used for indicating the SRS resource on the first BWP, and N is a positive integer.

In a possible implementation manner, the configuration information is used for indicating the SRS resource on at least one subband included in the unlicensed carrier.

In a possible implementation manner, the configuration information includes a starting resource block (RB) of the SRS resource and a number of RB included in the SRS resource, on at least part of subband in the at least one subband included in the unlicensed carrier.

In a possible implementation manner, the configuration information includes K bit, the K bit has a corresponding relationship with a resource block (RB) group included in the unlicensed carrier, the K bit is used for indicating the SRS resource on the unlicensed carrier, and K is a positive integer.

In a possible implementation manner, the configuration information includes a starting resource block (RB) of the SRS resource and a number of RB included in the SRS resource on the first BWP.

In a possible implementation manner, the configuration information is used for determining that a resource, which is included in a guard band between two adjacent subbands in the at least two subbands, does not include the SRS resource.

In a possible implementation manner, the SRS resource occupies M frequency domain units on the first BWP, and at least two frequency domain units in the M frequency domain units are discontinuous, where M is a positive integer greater than 1.

In a possible implementation manner, the SRS resource is located on a first subband and a second subband in the at least two subbands, the M frequency domain units include M1 frequency domain units and M2 frequency domain units, the M1 frequency domain units are located on the first subband, and the M2 frequency domain units are located on the second subband, where M1 and M2 are positive integers respectively.

In a possible implementation manner, the M1 frequency domain units are continuous, and the M2 frequency domain units are continuous.

In a possible implementation manner, any two adjacent frequency domain units in the M1 frequency domain units are discontinuous, and any two adjacent frequency domain units in the M2 frequency domain units are discontinuous.

In a ossible implementation manner, the method further includes performing, by the network device, SRS measurement according to a valid SRS resource in the SRS resource, where the valid SRS resource includes a SRS resource in the SRS resource that is on a subband and a symbol occupied by the terminal device.

In a possible implementation manner, the valid SRS resource is determined according to first indication information sent by the terminal device, or the valid SRS resource is determined according to reference signal detection.

In a fifth aspect, there is provided a terminal device, configured to perform the method in the foregoing first aspect or in various implementations thereof.

Specifically, the terminal device includes a functional module configured to perform the method in the foregoing first aspect or in various implementations thereof.

In a sixth aspect, there is provided a network device, configured to perform the method in the foregoing second aspect or in various implementations thereof.

Specifically, the terminal device includes a functional module configured to perform the method in the foregoing second aspect or in various implementations thereof.

In a seventh aspect, there is provided a terminal device, configured to perform the method in the foregoing third aspect or in various implementations thereof.

Specifically, the terminal device includes a functional module configured to perform the method in the foregoing third aspect or in various implementations thereof.

In an eighth aspect, there is provided a network device, configured to perform the method in the foregoing fourth aspect or in various implementations thereof.

Specifically, the network device includes a functional module configured to perform the method in the foregoing fourth aspect or in various implementations thereof.

In a ninth aspect, there is provided a terminal device, including a processor and a memory. The memory is configured to store a computer program, and the processor is configured to call and run the computer program stored in the memory so as to perform the method in the foregoing first aspect or in various implementations thereof.

In a tenth aspect, there is provided a network device, including a processor and a memory. The memory is configured to store a computer program, and the processor is configured to call and run the computer program stored in the memory so as to perform the method in the foregoing second aspect or in various implementations thereof.

In an eleventh aspect, there is provided a terminal device, including a processor and a memory. The memory is configured to store a computer program, and the processor is configured to call and run the computer program stored in the memory so as to perform the method in the foregoing third aspect or in various implementations thereof.

In a twelfth aspect, there is provided a network device, including a processor and a memory. The memory is configured to store a computer program, and the processor is configured to call and run the computer program stored in the memory so as to perform the method in the foregoing fourth aspect or in various implementations thereof.

In a thirteenth aspect, there is provided an apparatus, configured to implement the method in any of the foregoing first aspect to fourth aspect or in various implementations thereof.

Specifically, the apparatus includes a processor, configured to call and run a computer program stored in a memory, so that the apparatus performs the method in any of the foregoing first aspect to fourth aspect or in various implementations thereof.

In a fourteenth aspect, there is provided a computer-readable storage medium for storing a computer program, and the computer program causes a computer to perform the method in any of the foregoing first aspect to fourth aspect or in various implementations thereof.

In a fifteenth aspect, there is provided a computer program product, including a computer program instruction, and the computer program instruction causes a computer to perform the method in any of the foregoing first aspect to fourth aspect or in various implementations thereof.

In a sixteenth aspect, there is provided a computer program, and when the computer program is run on a computer, the computer is caused to perform the method in any of the foregoing first aspect to fourth aspect or in various implementations thereof.

Based on the foregoing technical solutions, the CSI-RS resource and/or the CSI-IM resource on the BWP on the unlicensed carrier that includes a plurality of the subbands can be determined by the terminal device according to the configuration of the CSI-RS resource and/or the CSI-IM resource by the network device, so that the terminal device performs the measurement based on the CSI-RS and/or the measurement based on CSI-IM, and thus may perform the valid channel measurement in large bandwidth of the downlink channel on the unlicensed carrier, which is beneficial to improving the communication performance.

DETAILED DESCRIPTION

The technical solutions in the embodiments of the present disclosure will be described below in conjunction with the accompanying drawings in the embodiments of the present disclosure. Obviously, the embodiments described are part of embodiments of the present disclosure, rather than all the embodiments. Based on the embodiments in the present disclosure, all other embodiments obtained by those of ordinary skilled in the art without creative work fall within the protection scope of the present disclosure.

The technical solutions of the embodiments of the present disclosure may be applied to various communication systems, for example, a Global System of Mobile communication (GSM), a Code Division Multiple Access (CDMA) system, a Wideband Code Division Multiple Access (WCDMA) system, General Packet Radio Service (GPRS), a Long Term Evolution (LTE) system, an Advanced long term evolution (LTE-A) system, a New Radio (NR) system, an evolution system of an NR system, an LTE-based access to unlicensed spectrum (LTE-U) system, an NR-based access to unlicensed spectrum (NR-U) system, a Universal Mobile Telecommunication System (UMTS), Wireless Local Area Networks (WLAN), Wireless Fidelity (WiFi), a next generation communication system, or other communication system, etc.

Generally speaking, a traditional communication system supports a limited number of connections, and is easy to implement. However, with the development of communication technology, a mobile communication system will not only support traditional communication, but also support, for example, Device to Device (D2D) communication, Machine to Machine (M2M) communication, Machine Type Communication (MTC), and Vehicle to Vehicle (V2V) communication, etc. The embodiments of the present disclosure may also be applied to these communication systems.

The frequency spectrum applied is not limited by the embodiments of the present disclosure. For example, the embodiments of the present disclosure may be applied to a licensed frequency spectrum, and may also be applied to an unlicensed frequency spectrum.

Figure 1:
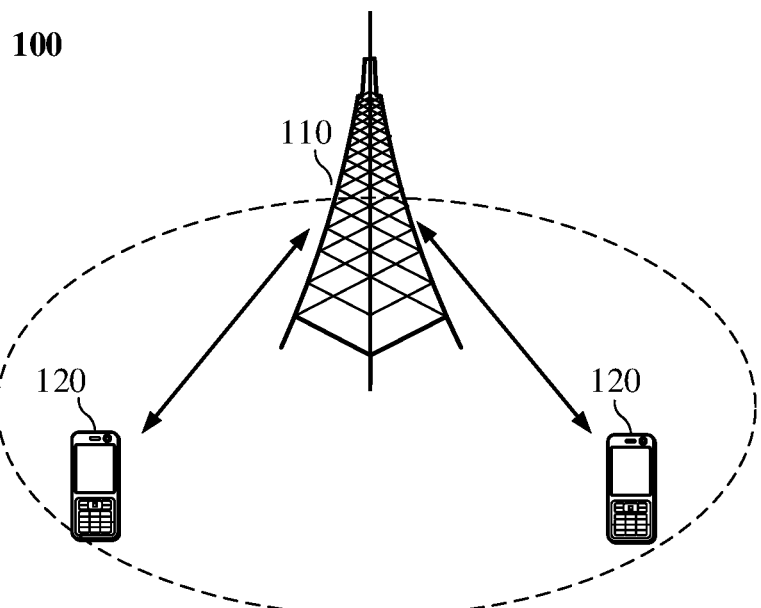
FIG. 1 is a schematic diagram of a communication system architecture provided by an embodiment of the present disclosure.

Exemplarily, a communication system 100 applied in the embodiments of the present disclosure is as shown in FIG. 1. The communication system 100 may include a network device 110, and the network device 110 may be a device which communicates with a terminal device 120 (or referred to as a communication terminal or a terminal). The network device 110 may provide communication coverage for a specific geographic area, and may communicate with a terminal device located within the coverage area. Optionally, the network device 110 may be a Base Transceiver Station (BTS) in a GSM or a CDMA system, a NodeB (NB) in a WCDMA system, an Evolutional Node B (eNB or eNodeB) in an LTE system, or a wireless controller in a Cloud Radio Access Network (CRAN). Or the network device may be a mobile switching center, a relay station, an access point, an in-vehicle device, a wearable device, a hub, a switch, a bridge, a router, a network side device in a 5G network or a network device in a future evolved Public Land Mobile Network (PLMN), etc.

The communication system 100 also includes at least one terminal device 120 located within the coverage area of the network device 110. As used hereby, the "terminal device" includes, but not limited to: User Equipment (UE), an access terminal, a user unit, a user station, a mobile station, a mobile platform, a remote station, a remote terminal, a mobile device, a user terminal, a terminal, a wireless communication device, a user agent or a user apparatus. The access terminal may be a cellular telephone, a cordless telephone, a Session Initiation Protocol (SIP) telephone, a Wireless Local Loop (WLL) station, a Personal Digital Assistant (PDA), a wireless communication functional handheld device, computing device or other processing device connected to a wireless modem, an in-vehicle device, a wearable device, a terminal device in a future 5G network, or a terminal device in a future evolved Public Land Mobile Network (PLMN), etc., which is not limited by the embodiments of the present disclosure.

Optionally, Device to Device (D2D) communication may be performed between the terminal devices 120.

Optionally, a 5G system or a 5G network may also be referred to as a New Radio (NR) system or an NR network.

FIG. 1 exemplarily shows one network device and two terminal devices. Optionally, the communication system 100 may include a plurality of network devices, and other number of terminal devices may be included within the coverage area of each network device, which is not limited by the embodiments of the present disclosure.

Optionally, the communication system 100 may also include other network entity such as a network controller, a mobile management entity and the like, which is not limited by the embodiments of the present disclosure.

It should be understood that the device with a communication function in the network/system in the embodiments of the present disclosure may be referred to as a communication device. Taking the communication system 100 shown in FIG. 1 as an example, the communication device may include a network device 110 and a terminal device 120 with the communication function, and the network device 110 and the terminal device 120 may be the specific devices described above, which is not elaborated here; and the communication device may also include other device in the communication system 100, for example, other network entity such as a network controller, a mobile management entity and the like, which is not limited in the embodiments of the present disclosure.

It should be understood that the terms "system" and "network" herein are often used interchangeably herein. The term "and/or" herein is only to describe a kind of association relationship among associated objects, and means that there may be three kinds of relationships. For example, A and/or B, may mean that there are the following three cases: A exists alone, A and B exist at the same time, and B exists alone. In addition, the character "/" herein generally indicates that the associated objects before and after are in an "or" relationship.

Figure 2:
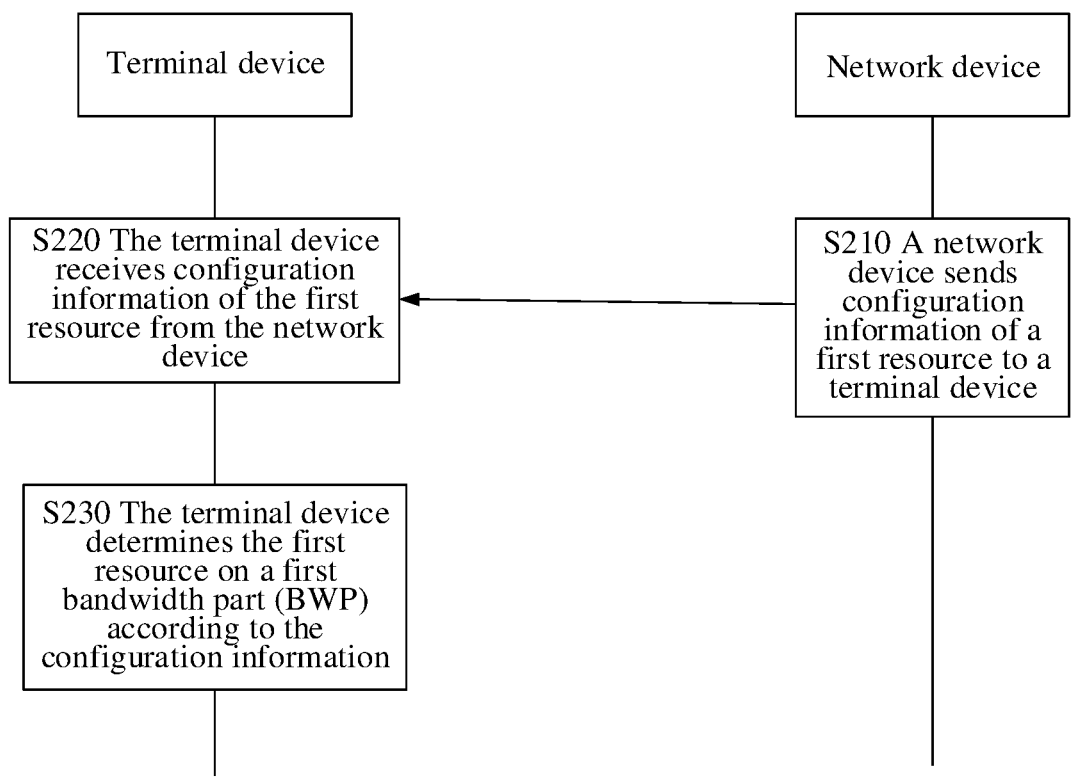
FIG. 2 is a schematic diagram of a method of wireless communication provided by an embodiment of the present disclosure.

FIG. 2 shows a schematic diagram of a wireless communication method 200 according to an embodiment of the present disclosure. As shown in FIG. 2, the method 200 includes some or all of the following contents.

In S210, a network device sends configuration information of a first resource to a terminal device.

In S220, the terminal device receives the configuration information of the first resource sent by the network device.

In S230, the terminal device determines the first resource on a first BWP according to the configuration information.

The first BWP is a BWP on an unlicensed frequency spectrum, and the first BWP includes at least two subbands in a frequency domain. The first resource may include a CSI-RS resource, a CSI-IM resource, or an SRS resource. If the first BWP is a downlink BWP, the first resource may include a CSI-RS resource and/or a CSI-IM resource; and if the first BWP is an uplink BWP, the first resource may include an SRS resource.

Before the embodiment of the present disclosure is described in detail, the following related technology will be introduced first.

1. The unlicensed frequency spectrum is a frequency spectrum applicable to radio device communication that is divided by a country and region. The frequency spectrum is usually considered to be a shared frequency spectrum, i.e., communication devices in different communication systems may use this frequency spectrum as long as the regulatory requirement on the frequency spectrum set by a country or a region is met, without applying for an exclusive frequency spectrum authorization from the government.

Some countries or regions stipulate the regulatory requirement of using the unlicensed frequency spectrum that must be met, so that various communication systems that perform wireless communication using the unlicensed frequency spectrum are able to coexist friendly on the frequency spectrum. For example, the communication device follows the principle of "Listen Before Talk (LBT)", i.e., before the communication device sends a signal on a channel of the unlicensed frequency spectrum, channel sense needs to be performed first. Only when the channel sense result is that the channel is idle, the communication device is able to send the signal. If the channel sense result of the communication device on the channel of the unlicensed frequency spectrum is that the channel is busy, the communication device is unable to send the signal. In order to ensure the fairness, in one transmission, the duration for which the communication device performs signal transmission using the channel of the unlicensed frequency spectrum can not exceed Maximum Channel Occupancy Time (MCOT). If the power of a signal transmitted on the channel of the unlicensed frequency spectrum is too large, transmission of other important signal (such as a radar signal) on this channel is affected. In order to avoid this, when performing signal transmission using the channel of the unlicensed frequency spectrum, the communication device needs to follow the limitation that the signal transmit power does not exceed the maximum transmit power and the maximum transmit power spectral density.

Figure 3:
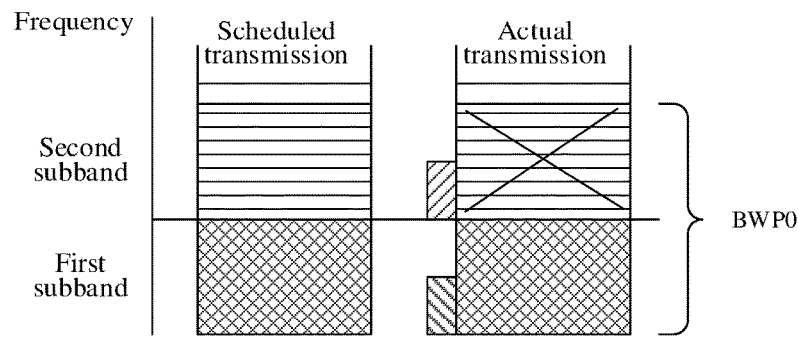
FIG. 3 is a schematic diagram of multi-subband adaptive transmission in an embodiment of the present disclosure.

2. In the scenario of broadband transmission with system carrier bandwidth greater than 20 MHz, UE may be configured with a plurality of BWPs and only one BWP is activated. When the activated BWP includes a plurality of LBT subbands, a base station may perform PDSCH transmission through some or all of the LBT subbands included in the activated BWP according to the channel detection result of the LBT subbands. As shown in FIG. 3, a BWP0 configured by the base station for the UE includes two LBT subbands: a first subband and a second subband. The base station plans to transmit a PDSCH to the UE through scheduling the first subband and the second subband. However, when each of the LBT subbands performs the channel detection, the first subband succeeds in LBT, and the second subband fails in LBT. Therefore, the base station transmits the Physical Downlink Shared Channel (PDSCH) to the UE through the first subband included in the BWP0.

It should be understood that the subband included in the first BWP may include the LBT subband here, or may be a subband composed of a specific number of resource block(s) (RB), which should not be limited by the embodiments of the present disclosure.

It should also be understood that the unlicensed carrier, the first BWP, the first resource, the subband and the like in the embodiments of the present disclosure are all concepts in a frequency domain. The configuration information of the first resource is used for indicating the frequency domain location of the first resource, that is, the terminal device determines the frequency domain location of the first resource on the first BWP according to the configuration information.

Specifically, the first resource may be configured by the network device for the terminal device. For example, the network device may perform configuration based on a BWP, an unlicensed carrier, a subband in a BWP, or a subband of an unlicensed carrier. No matter which manner the configuration is based on, the terminal device may determine the first resource on the first BWP on the unlicensed carrier according to the configuration information of the first resource, and the first BWP may include at least two subbands in the frequency domain. Furthermore, the terminal device may select a valid first resource from the configured first resource so as to perform communication or measurement. The so-called valid first resource may refer to a first resource in the configured first resource in which a signal has actually been transmitted. For example, the first resource is a CSI-RS resource, and the valid CSI-RS resource refers to a resource in the CSI-RS resource configured by the network device for the terminal device through which a CSI-RS has been sent, in other words, the valid CSI-RS resource refers to a CSI-RS resource in the CSI-RS resource configured by the network device for the terminal device that is on a subband and a symbol occupied by the network device. That is, the valid CSI-RS resource refers to a resource in the CSI-RS resource configured by the network device for the terminal device, this resource being on a subband of which the network device obtains the channel use right.

The configuration of the first resource may be implemented through the following manners.

1. The first resource is configured based on a BWP. The configuration information may be used for indicating the first resource on the first BWP. The terminal device may be configured with a plurality of BWPs, and the network device may configure the first resource on a respective BWP independently. For example, the network device may directly indicate to the terminal device a starting RB of the first resource on the first BWP and a number of RB(s) included in the first resource. For another example, the network device may also indicate the first resource on the first BWP to the terminal device through a bitmap. Specifically, the configuration information includes N bit(s), the N bit(s) has a corresponding relationship with a resource block (RB) group included in the first BWP, the N bit(s) is used for indicating the first resource on the first BWP, and N is a positive integer. It should be understood that a RB group may include one or more RBs, and a respective RB group included in the first BWP may include the same number of RB(s) or different numbers of RBs. It should also be understood that the N bits may correspond to the RB groups included in the first BWP one by one, or it may be that one bit corresponds to a plurality of RB groups, or it may be that a plurality of bits correspond to one RB group.

Alternatively, the network device may also configure one criterion, and after the terminal device receives the configured criterion, a first resource on the first BWP may be determined in combination of information of the first BWP. For example, it may be configured by the network device for the terminal device that on each BWP, resources on 24 consecutive RBs are the first resource with a common resource block (CRB) being a starting RB. Optionally, the first resource configured based on a BWP may be continuous or discontinuous in the frequency domain. The first resource configured based a BWP may cross a subband, or may not cross a subband.

2. The first resource is configured based on a subband on a BWP. The configuration information is used for indicating the first resource on at least one subband included in the first BWP. Likewise, the network device may configure the first resource on at least one subband included in each BWP independently. For example, the network device may indicate the first resource on each subband in the at least one subband included in the first BWP to the terminal device. In an implementable embodiment, the configuration information may include a starting RB of the first resource and a number of RBs included in the first resource, on each in the at least one subband. In another implementable embodiment, the configuration information may include a bitmap for indicating the first resource on each subband in the at least one subband. Alternatively, the configuration information for indicating the first resource on the at least one subband may also include a start RB of the first resource and a number of RBs included in the first resource, on each subband in part of the subbands, and may also include a bitmap for indicating the first resource on each subband in the other part of the subbands.

Alternatively, the network device may also be configured with one criterion, and after the terminal device receives the configuration information, the first resource on at least one subband included in the first BWP may be determined in combination with information of the first BWP and subband information included in the first BWP. For example, the configuration information is used for indicating a resource except for first few RBs and last few RBs on each subband in the first two subbands on each BWP.

Optionally, the first resource configured based on a subband on a BWP may be continuous, or may be discontinuous.

3. The first resource is configured based on an unlicensed carrier. The configuration information is used for indicating the first resource on the unlicensed carrier. The terminal device may determine the first resource on a first BWP in combination with information of the first BWP. In other words, the first resource on the first BWP may be an overlapped part of the first BWP with the first resource on the unlicensed carrier. The first resource is configured based on the unlicensed carrier. For example, the network device may directly indicate to the terminal device a number of RBs included in the first resource and a starting RB of the first resource on the unlicensed carrier. For another example, the network device may also indicate the first resource on the unlicensed carrier to the terminal device through a bitmap. Specifically, the configuration information includes K bit(s), the K bit(s) has a corresponding relationship with a resource block (RB) group included in the unlicensed carrier, the K bit(s) is used for indicating the first resource on the unlicensed carrier, and K is a positive integer. It should be understood that the RB group may include one or more RBs, and each RB group included in the unlicensed carrier may include the same number of RBs or different numbers of RBs. It should also be understood that the N bits may correspond to the RB groups included in the unlicensed carrier one by one, or one bit may correspond to a plurality of RB groups, or a plurality of bits may correspond to one RB group.

4. The first resource is configured based on a subband on an unlicensed carrier. The configuration information is used for indicating the first resource on at least one subband included in the unlicensed carrier. The terminal device may determine the first resource on a first BWP in combination of the subband(s) included in the first BWP. For example, the network device may indicate the first resource on each of the at least one subband included in the unlicensed carrier to the terminal device. In an implementable embodiment, the configuration information may include a starting RB of the first resource and a number of RBs included in the first resource, on each subband in the at least one subband. In another implementable embodiment, the configuration information may include a bitmap for indicating the first resource on each subband in the at least one subband. Alternatively, the configuration information for indicating the first resource on the at least one subband may also include a starting RB of the first resource and a number of RBs included in the first resource, on each subband in part of the subbands, and a bitmap for indicating the first resource on each subband in the other part of the subbands. According to the subbands included in the first BWP and the configuration information, the terminal device may first determine on which subbands on the first BWP the first resource is configured, and may further obtain the specific position of the configured first resource on these subbands.

Optionally, the network device may indicate to the terminal device through the configuration information that the first resource is not included on a guard band between two adjacent subbands in the at least two subbands included in the first BWP. For example, the first resource is a CSI-RS resource, and the terminal device does not perform CSI-RS measurement on a resource included in a guard band between the two adjacent subbands. For another example, the first resource is a CSI-IM resource, and the terminal device does not perform interference measurement on a resource included in a guard band between two adjacent subbands in the at least two subbands. For another example, the first resource is an SRS resource, and the terminal device does not transmit an SRS on a resource included in a guard band between two adjacent subbands in the at least two subbands.

Optionally, in an embodiment of the present disclosure, the first resource occupies M frequency domain units on the first BWP, and at least two frequency domain units in the M frequency domain units are discontinuous, where M is a positive integer greater than 1. The M frequency domain units may be located on at least one subband on the first BWP. For example, the M frequency domain units are located on a first subband and a second subband on the first BWP, the M frequency domain units include M1 frequency domain unit(s) and M2 frequency domain unit(s), the M1 frequency domain unit(s) is located on the first subband, and the M2 frequency domain unit(s) is located on the second subband, where M1 and M2 are positive integers respectively. It should be noted that (M1+M2) may be equal to M, or may be smaller than M. If (M1+M2) being equal to M, the first resource is only located on the first subband and the second subband included in the first BWP. If (M1+M2) being smaller than M, the first resource may also be located on a third subband or a fourth subband included in the first BWP, that is, the first resource may also be located on other subband in addition to the first subband and the second subband.

Optionally, the M1 frequency domain units may be continuous or discontinuous, and the M2 frequency domain units may also be continuous or discontinuous.

Optionally, if the first BWP is a downlink BWP, the first resource may include a CSI-RS resource and/or a CSI-IM resource. If the first resource only includes the CSI-RS resource or the CSI-IM resource, configuration of the first resource may be implemented as any of the aforementioned manners. If the first resource includes both the CSI-RS resource and the CSI-IM resource, configuration of both of the CSI-RS resource and the CSI-IM resource may be implemented as any of the aforementioned manners. For example, the configuration information is used for indicating the CSI-RS resource on the first BWP and the CSI-IM resource on the first BWP. Specifically, the configuration information may include a starting RB of the CSI-RS resource and a number of RBs included in the CSI-RS resource on the first BWP, and a starting RB of the CSI-IM resource and a number of RBs included in the CSI-IM resource on the first BWP.

The technical solutions of the present disclosure will be described below in detail with the first resource being a CSI-RS resource, a CSI-IM resource and an SRS resource.

For a CSI-RS resource, the bandwidth size occupied by a frequency domain is configured through a CSI-Frequency-Occupation parameter. Specifically, startingRB represents the first RB occupied by the CSI-RS resource of which the reference point is the CRB 0, and the value can only be a multiple of 4. nrofRBs represents a number of RBs occupied by the CSI-RS resource, the value can also only be a multiple of 4, and the minimum configuration parameter is min (24, bandwidth of the associated BWP). If the configuration parameter is greater than the bandwidth of the associated BWP, the UE should assume that the bandwidth of the actual CSI-RS transmission is equal to the bandwidth of the associated BWP. The bandwidth of the associated BWP may be understood as the number of RBs included in the bandwidth of the associated BWP.

For the CSI-RS resource, the first BWP is a downlink BWP. After obtaining the channel use right on an unlicensed carrier, the network device sends a CSI-RS to the terminal device through all or part of the resources in the determined first resource, and the terminal device receives the CSI-RS through all or part of the resources in the first resource. In other words, the network device sends the CSI-RS to the terminal device through a valid CSI-RS resource in the configured CSI-RS resource, the terminal device performs channel state information (CSI) measurement according to the valid CSI-RS resource in the configured CSI-RS resource, and the valid CSI-RS resource includes a resource in the configured CSI-RS resource that is on a subband and a symbol occupied by the network device. The subband and the symbol occupied by the network device may refer to a time-frequency resource in which the network device obtains the channel use right. For example, the first BWP includes two subbands, a first subband and a second subband. When the network device performs channel detection on the first subband and the second subband, if the detection on the first subband succeeds and the detection on the second subband fails, then the network device transmits the CSI-RS to the terminal device on the CSI-RS resource on the first subband. The CSI-RS resource on the first subband is the valid CSI-RS resource. The CSI-RS resource on the second subband may be an invalid CSI-RS resource. It should be understood that the configured CSI-RS resource here may be a configured CSI-RS resource on the first BWP, or may be a configured CSI-RS resource on the unlicensed carrier.

Optionally, the network device may send first indication information to the terminal device, and the terminal device determines the valid CSI-RS resource according to the first indication information. Alternatively, the terminal device may also determine the valid CSI-RS resource according to the detection of a reference signal. In other words, the terminal device may detect the existence of the CSI-RS on the configured CSI-RS resource, and determine the valid CSI-RS resource according to the existence detection. For example, the terminal device performs existence detection according to serial correlation detection.

The terminal device performs channel state information (CSI) measurement according to the valid CSI-RS resource in the CSI-RS resource, which may include that the terminal device performs at least one of channel measurement, interference measurement, timing estimation, frequency deviation estimation, phase tracking, Radio Resource Management (RRM), and radio link monitoring (RLM) on a CSI-RS on the valid CSI-RS resource. The terminal device performs the channel measurement on the CSI-RS on the valid CSI-RS resource, and thus may obtain CSI. The CSI includes at least one of: a CSI Signal to Interference plus Noise Ratio (SINR), a Rank Indicator (RI), a Precoding Matrix Indicator (PMI), a Channel quality indicator (CQI), a Precoding Type Indicator (PTI), a CSI-RS resource indicator (CRI) and a beam direction. The terminal device performs the RRM measurement on the CSI-RS on the valid CSI-RS resource, and thus may obtain at least one of: CSI-reference signal received power (RSRP), CSI-reference signal received quality (RSRQ) and a CSI-SINR.

After performing the CSI measurement, the terminal device may report target CSI corresponding to the configured CSI-RS resource to the network device. In general, the format or the bit size of the CSI reported by the terminal device to network device may be fixed, for example, be fixed to 16 bits. When the valid CSI-RS resource is only part of the resource in the configured CSI-RS resource, it is necessary to specify CSI corresponding to the invalid resource in the configured CSI-RS resource. The valid CSI-RS resource includes a CSI-RS resource in the CSI-RS resource configured that is on a subband and a symbol occupied by the network device.

The target CSI includes first CSI, where the first CSI may be obtained according to measurement of the valid CSI-RS resource. Optionally, the target CSI-RS may also include a preset bit, and the preset bit may be used for indicating measurement information corresponding to the invalid CSI-RS resource. Alternatively, the target CSI-RS may also include second CSI, and the second CSI is CSI obtained from any of previous valid measurement corresponding to the invalid CSI-RS resource. For example, the second CSI may be CSI obtained from most recent valid measurement corresponding to the invalid CSI-RS resource.

Optionally, the target CSI may also include subband information corresponding to the first CSI.

Optionally, the target CSI may not include measurement information on a resource included in a guard band between two adjacent subbands.

For example, the first BWP includes a subband 0 and a subband 1, and the CSI-RS resource is configured on the subband 0 and the subband 1. At time t0, CSI-RSs on the subband 0 and the subband 1 is transmitted, and at time t1, only the CSI-RS on the subband 1 is transmitted.

1. The target CSI includes 8 bits, where the first 4 bits are for a measurement information report corresponding to the subband 0, and the last 4 bits are for a measurement information report corresponding to the subband 1. In the target CSI corresponding to time t0, the target CSI is [aaaabbbb], where aaaa represents the CSI on the subband 0 at time t0, and bbbb represents the CSI on the subband 1 at time t0. The target CSI corresponding to time t1 may be divided into the following two cases.

In case 1 of [rrrrcccc], cccc represents the CSI on the subband 1 at time t1, and rrrr represents reserved bits. For example, the value of rrrr is fixed to be 1111.

In case 2 of [aaaacccc], cccc represents the CSI on the subband 1 at time t1, and aaaa is the most recent valid measurement result on the subband 0.

2. The reported CSI format may be a subband number+subband measurement result, where the bit size included in the reported CSI is pre-configured by the network device. The number of reported subbands configured by the network device is smaller than or equal to the number of subbands included in the BWP. The terminal device may select one subband from the measured subbands to report. For example, the network device configures to report one subbandy, and the CSI information reported by the terminal device may be: a CSI report corresponding to time t0 is [0aaaa]; a CSI report corresponding to time t1 is [1cccc]; and where 0aaaa represents the CSI on the subband 0 at time t0, and 1cccc represents the CSI on the subband 1 at time t1. When the CSI corresponding to a certain reporting time does not include the valid CSI, the reserve bit in case 2 or reporting any of previous valid CSI may also be adopted.

It should be noted that, in aforementioned examples, the CSI on a certain subband may include CSI obtained according to measurement of all the resource in the valid CSI-RS resource on the subband, such as wideband CSI on the subband (wideband CQI or wideband PMI on the subband, etc.), and may also include CSI obtained according to measurement of part of the resource in the valid CSI-RS on the subband, such as subband CSI on the subband (subband CQI or subband PMI on the subband, etc.), which is not limited by the embodiments of the present disclosure.

For a CSI-IM resource, the first BWP is a downlink BWP. The network device may not send any signal on the configured CSI-IM resource. The terminal device may perform interference measurement through all or part of the configured CSI-IM resource.

Optionally, the configured CSI-IM resource may include a second resource and/or a third resource, where the second resource includes a CSI-IM resource in the configured CSI-IM resource that is on a subband and a symbol occupied by the network device, in other words, the second resource includes part of the resource in the configured CSI-IM resource that is on a subband of which the network device obtains the channel use right in the frequency domain. The third resource includes a CSI-IM resource in the configured CSI-IM resource that is on a subband or a symbol not occupied by the network device. In other words, the third resource includes part of the resource in the configured CSI-IM resource that is on a subband of which the network device does not obtain the channel use right in the frequency domain.

The terminal device may perform interference measurement on the second resource or the third resource independently. For example, the terminal device performs the interference measurement on the second resource. Furthermore, the terminal device may filter the result of the interference measurement on the second resource. Alternatively, the terminal device performs the interference measurement on the third resource. Furthermore, the terminal device may filter the result of the interference measurement on the third resource.

The terminal device may also combine the second resource and the third resource, and perform the interference measurement thereon. Furthermore, the terminal device may filter the result of interference measurement on the CSI-IM resource combined together.

Optionally, the network device may send second indication information to the terminal device. The terminal device receives the second indication information, and determines the second resource and/or the third resource according to the second indication information.

For an SRS resource, the first BWP is an uplink BWP. After obtaining the channel use right on the unlicensed carrier, the terminal device sends an SRS to the network device through all or part of the resource in the determined first resource, and the network device receives the SRS through all or part of the resource in the first resource. In other words, the terminal device sends the SRS to the network device through a valid SRS resource in the configured SRS resource, the network device performs measurement according to the valid SRS resource in the configured SRS resource, and the valid SRS resource includes an SRS resource in the SRS resource configured that is on a subband and a symbol occupied by the terminal device. The subband and the symbol occupied by the terminal device may refer to a time-frequency resource in which the terminal device obtains the channel use right. For example, the first BWP includes two subbands, a first subband and a second subband. When the terminal device performs channel detection on the first subband and the second subband, if the detection on the first subband succeeds and the detection on the second subband fails, then the terminal device transmits the SRS to the network device on the SRS resource on the first subband. The SRS resource on the first subband is the valid SRS resource. The SRS resource on the second subband may be an invalid SRS resource. It should be understood that the configured SRS resource here may be a configured SRS resource on the first BWP, or may be a configured SRS resource on the unlicensed carrier.

Optionally, the terminal device may send first indication information to the network device, and the network device determines the valid SRS resource according to the first indication information. Alternatively, the network device may also determine the valid SRS resource according to the detection of a reference signal. In other words, the network device may detect the existence of the SRS on the configured SRS resource, and determine the valid SRS resource according to the existence detection. For example, the network device performs existence detection according to serial correlation detection.

The network device performs measurement according to the valid SRS resource in the SRS resource, which may include that the network device performs at least one of channel measurement, interference measurement, timing estimation, frequency deviation estimation, and phase tracking, etc. on the SRS on the valid CSI-RS resource. The network device performs the channel measurement on the SRS on the valid SRS resource, and thus may obtain at least one of: an SRS SINR, an RI, a PMI, a CQI and a beam direction, etc.

Optionally, the SRS sent by the terminal device on the valid SRS resource does not support frequency hopping. For example, items included in configuration of a frequency domain resource of the SRS may be as shown in Table 1, and the SRS resource configuration on the unlicensed carrier only supports the SRS transmission in Table 1, and does not support frequency hopping.

TABLE 1

| $C_{SRS}$ | $B_{SRS} = 0$ | | $B_{SRS} = 1$ | | $B_{SRS} = 2$ | | $B_{SRS} = 3$ | |
| --- | --- | --- | --- | --- | --- | --- | --- | --- |
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 4 | 1 | 4 | 1 | 4 | 1 | 4 | 1 |
| 1 | 8 | 1 | 4 | 9 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 16 | 1 | 8 | 2 | 4 | 2 | 4 | 1 |
| 5 | 20 | 1 | 4 | 5 | 4 | 1 | 4 | 1 |
| 6 | 24 | 1 | 4 | 6 | 4 | 1 | 4 | 1 |
| 7 | 24 | 1 | 12 | 2 | 4 | 3 | 4 | 1 |

Optionally, the configured SRS resource is located on a first subband and a second subband in the at least two subbands, the configured SRS resource occupies M frequency domain units in the frequency domain, M1 frequency domain unit(s) in the M frequency domain units is located on the first subband, M2 frequency domain unit(s) in the M frequency domain units is located on the second subband, and M is greater than or equal to (M1+M2). Correspondingly, an SRS sequence corresponding to the configured SRS resource includes a first SRS subsequence and a second SRS subsequence, where the first SRS subsequence is generated according to the M1 frequency domain unit(s), and the second SRS subsequence is generated according to the M2 frequency domain unit(s). The first SRS subsequence is transmitted through the M1 frequency domain unit(s) on the first subband, and the second SRS subsequence is transmitted through the M2 frequency domain unit(s) on the second subband. For example, the first SRS subsequence and the second SRS subsequence are generated independently.

Optionally, the configured SRS resource is located on the first subband and the second subband in the at least two subbands, the configured SRS resource occupies M frequency domain units in the frequency domain, M1 frequency domain unit(s) in the M frequency domain units is located on the first subband, M2 frequency domain unit(s) in the M frequency domain units is located on the second subband, and M is greater than or equal to (M1+M2). Correspondingly, an SRS sequence corresponding to the configured SRS resource is generated according to M frequency domain units, and the SRS sequence is transmitted through M frequency domain units. For example, what is transmitted on the first subband is part of the elements in the SRS sequence that matches M1 frequency domain unit(s), and what is transmitted on the second subband is part of the elements in the SRS sequence that matches M2 frequency domain unit(s) and is not overlapped with the element(s) on the first subband.

Optionally, the M1 frequency domain units are continuous, and the M2 frequency domain units are continuous.

Optionally, any two adjacent frequency domain units in the M1 frequency domain units are discontinuous, and any two adjacent frequency domain units in the M2 frequency domain units are discontinuous. Further optionally, any two adjacent frequency domain units in the M1 frequency domain units are discontinuous and frequency domain intervals are equal, and any two adjacent frequency domain units in the M2 frequency domain units are discontinuous and the frequency domain intervals are equal. This is mainly because that on the unlicensed frequency spectrum, the specified power spectral density can not be exceeded when a signal is sent, and sending an uplink signal with a discretely distributed frequency domain resource may improve the transmit power of the uplink signal.

After performing measurement of the valid SRS resource in the configured SRS resource, the network device may schedule the terminal device to perform downlink transmission or uplink transmission according to the measurement information.

It should be understood that configuration information of the first resource in the embodiments of the present disclosure may include configuration information of the first resource on the unlicensed carrier, and may also include configuration information of the first resource on the licensed carrier, in summary, other configuration information is ok, as long as the terminal device can determine the first resource on the BWP of the unlicensed carrier according to the configuration information.

It should also be understood that the configuration information of the first resource, and/or the first indication information, and/or the second indication information in the embodiments of the present disclosure, may be sent to the terminal device through an unlicensed carrier, or may be sent to the terminal device through a licensed carrier.

The configuration method of the first resource will be illustrated with a CSI-RS resource taken as an example.

Figure 4:
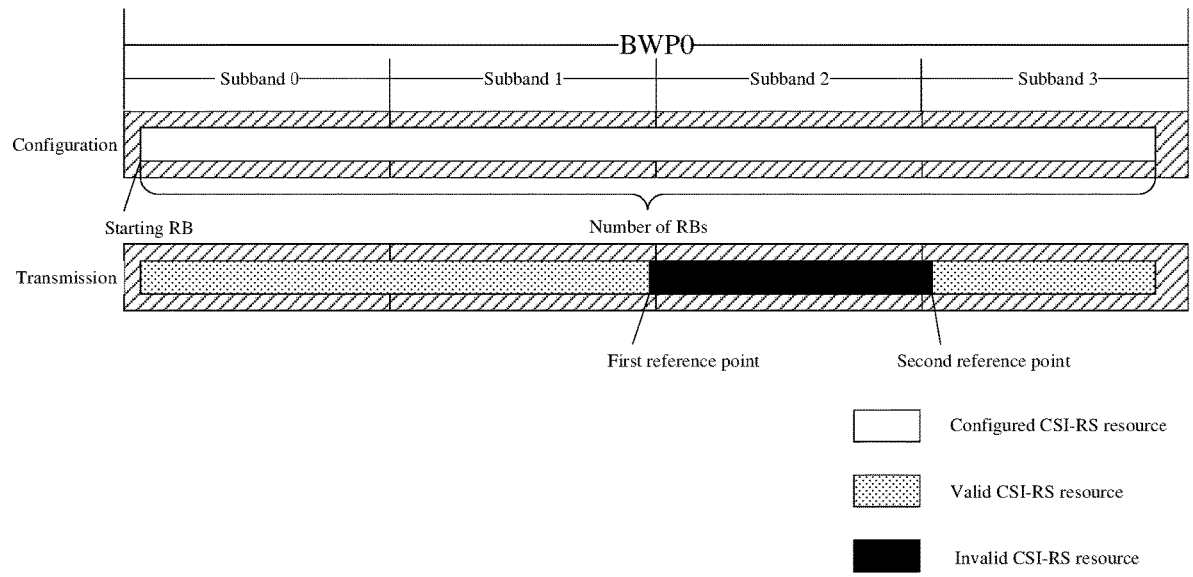
FIG. 4 is a schematic diagram of a configuration manner of a first resource in an embodiment of the present disclosure.

1. As shown in FIG. 4, the frequency domain resource included in a configured CSI-RS resource on a BWP0 is continuous. As shown in FIG. 4, the frequency domain resource included in the configured CSI-RS resource is determined according to the following two parameters: a starting RB (such as startingRB) and a number of RBs (such as nrofRBs). Optionally, the starting RB represents the first RB occupied by the configured CSI-RS resource of which the reference point is the CRB 0, and the value can only be a multiple of 4; and the number of RBs represents the number of RBs occupied by the configured CSI-RS resource, and the value can only be a multiple of 4, too.

When the network device is performing transmission of a CSI-RS, due to failure of LBT on part of subbands (such as a subband 2 in FIG. 4, i.e., an invalid resource), the network device can only perform CSI-RS transmission through part of subbands (such as a subband 0, a subband 1 and a subband 3 in FIG. 4, i.e., valid CSI-RS resources) included in the BWP0. In this case, the terminal device needs to determine a frequency domain resource on which no CSI-RS is transmitted, for example, the terminal device determines a first reference point and/or a second reference point, and then determines that no CSI-RS transmission is performed on the subband 2 according to the two reference points. Furthermore, the terminal device performs CSI-RS reception according to the CSI-RS transmitted on the subband 0, the subband 1, and the subband 3.

Optionally, the terminal device may determine the first reference point and/or the second reference point according to indication sent by the network device for determining the transmission bandwidth. Optionally, the terminal device may determine the first reference point and/or the second reference point according to the existence detection of the CSI-RS on different subbands. Optionally, the location of the first reference point and/or the second reference point is predefined, or is configured by the network device. Optionally, the terminal device determines that the frequency domain resource on which no CSI-RS is transmitted includes a guard band between two adjacent subbands.

Figure 5:
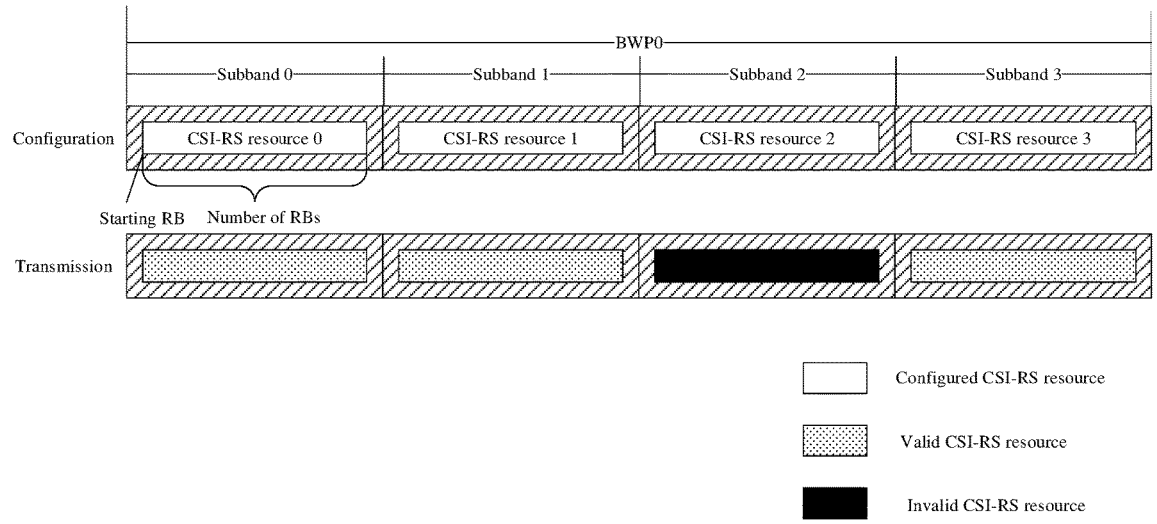
FIG. 5 is a schematic diagram of another configuration manner of a first resource in an embodiment of the present disclosure.

2. Each subband is configured with a CSI-RS resource, and the terminal device determines the CSI-RS resource included in a BWP0 according to the subbands included in a first BWP. As shown in FIG. 5, a CSI-RS resource 0 is configured on a subband 0, a CSI-RS resource 1 is configured on a subband 1, a CSI-RS resource 2 is configured on a subband 2, and a CSI-RS resource 3 is configured on a subband 3. When the BWP0 includes the subband 0, the subband 1, the subband 2 and the subband 3, correspondingly, the CSI-RS resource configured on the BWP0 includes the CSI-RS resource 0, the CSI-RS resource 1, the CSI-RS resource 2, and the CSI-RS resource 3. Optionally, the frequency domain resource included in the CSI-RS resource on each subband is determined according to two parameters: a starting RB (such as startingRB) and a number of RBs (such as nrofRBs). Optionally, a guard band between two adjacent subbands does not include the CSI-RS resource, that is, the CSI-RS resource on two adjacent subbands is not continuous in the frequency domain. Optionally, corresponding CSI-RS patterns on the CSI-RS resource 0, the CSI-RS resource 1, the CSI-RS resource 2, and the CSI-RS resource 3 may be the same.

When the network device is performing transmission of a CSI-RS, due to failure of LBT on part of the subbands (such as the subband 2 in FIG. 5, i.e., the invalid resource), the network device can only perform CSI-RS transmission through part of the subbands (such as the subband 0, the subband 1 and a subband the in FIG. 5, i.e., the valid CSI-RS resources) included in the BWP0. In this case, the network device has performed transmission on the CSI-RS resource 0, the CSI-RS resource 1 and the CSI-RS resource 3, and the terminal device may receive the CIS-RS on each subband independently, thereby determining reception of the first CSI-RS.

Optionally, the terminal device may determine the CSI-RS frequency domain resource for actual transmission according to indication sent by the network device for determining transmission bandwidth. Optionally, the terminal device may determine the CSI-RS frequency domain resource for actual transmission according to the existence detection of the CSI-RS on each subband.

Therefore, it is supported by the present embodiment that the CSI-RS resource is configured for each subband independently. When different BWPs included in a plurality of BWPs configured for the terminal device include different subbands, measurement of CSI-RS on different BWPs may be implemented through a combination of CSI-RS resources configured on different subbands, and the flexibility is high.

Figure 6:
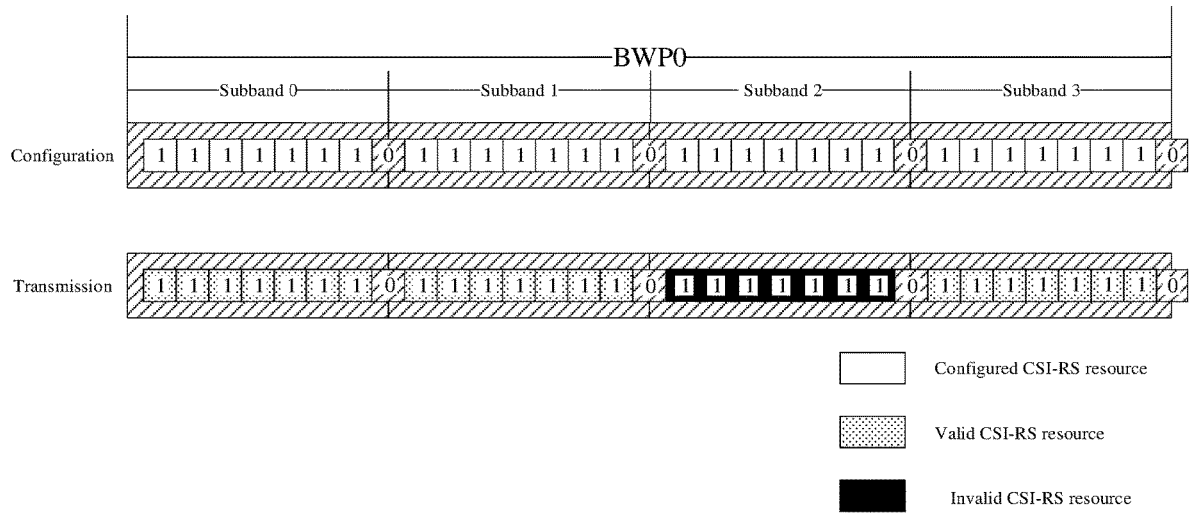
FIG. 6 is a schematic diagram of still another configuration manner of a first resource in an embodiment of the present disclosure.

3. The frequency domain resource included in a CSI-RS resource on a first BWP is configured discontinuously. Optionally, the frequency domain resource included in the CSI-RS resource is configured through the manner of a bitmap. Optionally, a guard band between any two adjacent subbands is not used for CSI-RS transmission. As shown in FIG. 6, a CSI-RS frequency domain resource configuration parameter includes an N-bit bitmap, where each bit corresponds to one RB group in a BWP0, and each RB group includes L RB(s). The BWP0 may include a plurality of non-overlapped and continuous RB groups, and the bitmap has a one-to-one mapping relationship with the RB groups included in the BWP0, where the first bit corresponds to the first RB group in the BWP0, and the starting location of the first RB group is determined according to the starting location $N_{start}$ of the BWP0, i.e., the index of the first RB in the first RB group is $L*\text{ceil}(N_{start}/L)$, where ceil represents rounding up. Optionally, if the value of a bit is 1, then the corresponding RB group is configured as the CSI-RS frequency domain resource, and if the value of a bit is 0, then the corresponding RB group is not configured as the CSI-RS frequency domain resource. FIG. 6 gives one example of the CSI-RS frequency domain resource configuration.

As shown in FIG. 6, each RB group includes 4 RBs, i.e., L=4. BWP0 includes 4 subbands. The frequency domain resource included in the CSI-RS resource is divided into 4 clusters, which are distributed on each subband in the 4 subbands respectively. Optionally, the frequency domain resource of the CSI-RS resource included in each subband is continuous in the frequency domain. Optionally, a guard band between two adjacent subbands does not include the CSI-RS resource, that is, the CSI-RS resource on two adjacent subbands is discontinuous in the frequency domain.

When the network device is performing transmission of a CSI-RS, because of failure of LBT on part of the subbands (such as a subband 2 in FIG. 6, i.e., an invalid resource), the network device can only perform CSI-RS transmission through part of the subbands (such as a subband 0, a subband 1 and a subband 3 in FIG. 4, i.e., valid CSI-RS resources) included in the BWP0. In this case, the network device has performed transmission on CSI-RS resource on the subband 0, the subband 1 and the subband 3, and the terminal device may receive the CIS-RS on each subband independently, thereby determining reception of the CSI-RS.

Optionally, the terminal device may determine the CSI-RS frequency domain resource for actual transmission according to indication sent by the network device for determining transmission bandwidth. Optionally, the terminal device may determine the CSI-RS frequency domain resource for actual transmission according to the existence detection of the CSI-RS on each subband.

Therefore, independent configuration of the CSI-RS resource on each subband is implemented by the present embodiment through the manner of a bitmap, and the signaling indication is simple.

It should be understood that in various embodiments of the present disclosure, sizes of the sequence numbers of the foregoing processes do not indicate execution sequences. The execution sequence of each process should be determined according to a function and inherent logic thereof, and should not constitute any limit on the implementation process of the embodiments of the present disclosure.

Figure 7:
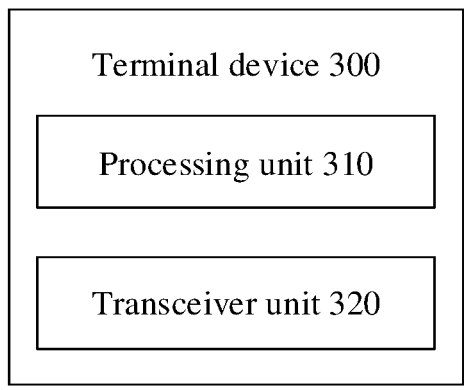
FIG. 7 is a schematic block diagram of a terminal device provided by an embodiment of the present disclosure.

FIG. 7 shows a schematic block diagram of a terminal device 300 according to an embodiment of the present disclosure. As shown in FIG. 7, the terminal device 300 includes a transceiver unit 310, configured to receive configuration information of a first resource sent by a network device, where the first resource includes a channel state information reference signal (CSI-RS) resource and/or a channel state information interference measurement (CSI-IM) resource; and a processing unit 320, configured to determine the first resource on a first bandwidth part (BWP) according to the configuration information, where the first BWP is a BWP on an unlicensed carrier, and the first BWP includes at least two subbands in a frequency domain.

Optionally, in the embodiments of the present disclosure, the configuration information is used for indicating the first resource on the first BWP.

Optionally, in the embodiments of the present disclosure, the configuration information is used for indicating the first resource on at least one subband included in the first BWP.

Optionally, in the embodiments of the present disclosure, the configuration information includes a starting resource block (RB) of the first resource and a number of RB(s) included in the first resource, on at least part of subband in the at least one subband included in the first BWP.

Optionally, in the embodiments of the present disclosure, the configuration information includes N bit(s), the N bit(s) has a corresponding relationship with a resource block (RB) group included in the first BWP, the N bit(s) is used for indicating the first resource on the first BWP, and N is a positive integer.

Optionally, in the embodiments of the present disclosure, the configuration information is used for indicating the first resource on at least one subband included in the unlicensed carrier, and the processing unit is specifically configured to determine the first resource on the first BWP according to the configuration information and the subbands included in the first BWP.

Optionally, in the embodiments of the present disclosure, the configuration information includes a starting resource block of the first resource and a number of RB(s) included in the first resource that is on at least part of subband in the at least one subband included in the unlicensed carrier.

Optionally, in the embodiments of the present disclosure, the configuration information includes K bit(s), the K bit(s) has a corresponding relationship with a resource block (RB) group included in the unlicensed carrier, the K(s) bit is used for indicating the first resource on the unlicensed carrier, and K is a positive integer.

Optionally, in the embodiments of the present disclosure, the configuration information includes a starting resource block (RB) of the first resource and a number of RB(s) included in the first resource on the first BWP.

Optionally, in the embodiments of the present disclosure, the configuration information is used for determining that a resource, which is included in a guard band between two adjacent subbands in the at least two subbands, does not include the first resource.

Optionally, in the embodiments of the present disclosure, the first resource occupies M frequency domain units on the first BWP, and at least two frequency domain units in the M frequency domain units are discontinuous, where M is a positive integer greater than 1.

Optionally, in the embodiments of the present disclosure, the first resource is located on a first subband and a second subband in the at least two subbands, the M frequency domain units include M1 frequency domain unit and M2 frequency domain unit, the M1 frequency domain unit is located on the first subband, and the M2 frequency domain unit is located on the second subband, where M1 and M2 are positive integers respectively.

Optionally, in the embodiments of the present disclosure, the M1 frequency domain units are continuous, and the M2 frequency domain units are continuous.

Optionally, in the embodiments of the present disclosure, the first resource includes a CSI-RS resource, and the processing unit is further configured to perform channel state information (CSI) measurement according to a valid CSI-RS resource in the CSI-RS resource, where the valid CSI-RS resource includes a CSI-RS resource in the CSI-RS resource that is on a subband and a symbol occupied by the network device.

Optionally, in the embodiments of the present disclosure, the valid CSI-RS resource is determined according to first indication information sent by the network device, or the valid CSI-RS resource is determined according to reference signal detection.

Optionally, in the embodiments of the present disclosure, the first resource includes a CSI-RS resource, and the transceiver unit is further configured to report target CSI corresponding to the CSI-RS resource to the network device, where the target CSI includes first CSI, the first CSI is obtained according to measurement of a valid CSI-RS resource in the CSI-RS resource, and the valid CSI-RS resource includes a CSI-RS resource in the CSI-RS resource that is on a subband and a symbol occupied by the network device.

Optionally, in the embodiments of the present disclosure, the target CSI includes a preset bit, and the preset bit is used for indicating measurement information corresponding to an invalid CSI-RS resource in the CSI-RS resource; or, the target CSI includes second CSI, and the second CSI is CSI obtained from most recent valid measurement corresponding to an invalid CSI-RS resource in the CSI-RS resource, where the invalid CSI-RS resource includes a CSI-RS resource in the CSI-RS resource that is on a subband or a symbol not occupied by the network device.

Optionally, in the embodiments of the present disclosure, the target CSI includes subband information corresponding to the first CSI.

Optionally, in the embodiments of the present disclosure, the target CSI does not include measurement information of a resource included in a guard band between two adjacent subbands in the at least two subbands.

Optionally, in the embodiments of the present disclosure, the first resource includes a CSI-IM resource, and the processing unit is further configured to perform interference measurement on a second resource, where the second resource includes a CSI-IM resource in the CSI-IM resource that is on a subband and a symbol occupied by the network device; and/or, perform interference measurement on a third resource, where the third resource includes a CSI-IM resource in the CSI-IM resource that is on a subband or a symbol not occupied by the network device.

Optionally, in the embodiments of the present disclosure, the terminal device does not perform interference measurement on a resource included in a guard band between two adjacent subbands in the at least two subbands.

Optionally, in the embodiments of the present disclosure, the transceiver unit is further configured to receive second indication information sent by the network device, where the second indication information is used for determining the second resource and/or the third resource.

It should be understood that the terminal device 300 according to the embodiments of the present disclosure may correspond to the terminal device in the method embodiments of the present disclosure, and the aforementioned and other operation and/or function of each unit in the terminal device 300 are used to implement the corresponding process of the terminal device in the method of FIG. 2, which is not elaborated here for simplicity.

Figure 8:
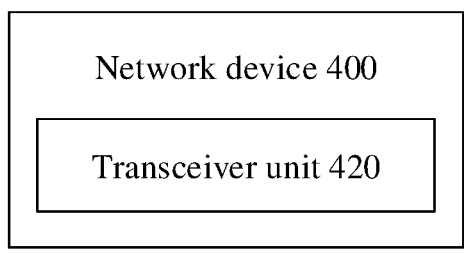
FIG. 8 is a schematic block diagram of a network device provided by an embodiment of the present disclosure.

FIG. 8 shows a schematic block diagram of a network device 400 according to an embodiment of the present disclosure. As shown in FIG. 8, the network device 400 includes a transceiver unit 410, configured to send configuration information of a first resource to a terminal device, where the configuration information is used for determining the first resource on a first bandwidth part (BWP) by the terminal device, the first BWP is a BWP on an unlicensed carrier, the first BWP includes at least two subbands in a frequency domain, and the first resource includes a channel state information reference signal (CSI-RS) resource and/or a channel state information interference measurement (CSI-IM) resource.

Optionally, in the embodiments of the present disclosure, the configuration information is used for indicating the first resource on the first BWP.

Optionally, in the embodiments of the present disclosure, the configuration information is used for indicating the first resource on at least one subband included in the first BWP.

Optionally, in the embodiments of the present disclosure, the configuration information includes a starting resource block (RB) of the first resource and a number of RB(s) included in the first resource on at least part of subband in the least one subband included in the first BWP.

Optionally, in the embodiments of the present disclosure, the configuration information includes N bit(s), the N bit(s) has a corresponding relationship with a resource block (RB) group included in the first BWP, the N bit(s) is used for indicating the first resource on the first BWP, and N is a positive integer.

Optionally, in the embodiments of the present disclosure, the configuration information is used for indicating the first resource on at least one subband included in the unlicensed carrier.

Optionally, in the embodiments of the present disclosure, the configuration information includes a starting resource block (RB) of the first resource and a number of RB(s) included in the first resource, on at least part of subband in the at least one subband in the unlicensed carrier.

Optionally, in the embodiments of the present disclosure, the configuration information includes K bit(s), the K bit(s) has a corresponding relationship with a resource block (RB) group included in the unlicensed carrier, the K bit(s) is used for indicating the first resource on the unlicensed carrier, and K is a positive integer.

Optionally, in the embodiments of the present disclosure, the configuration information includes a starting resource block (RB) of the first resource and a number of RB(s) included in the first resource on the first BWP.

Optionally, in the embodiments of the present disclosure, the configuration information is used for determining that a resource, which is included in a guard band between two adjacent subbands in the at least two subbands, does not include the first resource.

Optionally, in the embodiments of the present disclosure, the first resource occupies M frequency domain units on the first BWP, and at least two frequency domain units in the M frequency domain units are discontinuous, where M is a positive integer greater than 1.

Optionally, in the embodiments of the present disclosure, the first resource is located on a first subband and a second subband in the at least two subbands, the M frequency domain units include M1 frequency domain unit(s) and M2 frequency domain unit(s), the M1 frequency domain unit(s) is located on the first subband, and the M2 frequency domain unit(s) is located on the second subband, where M1 and M2 are positive integers respectively.

Optionally, in the embodiments of the present disclosure, the M1 frequency domain units are continuous, and the M2 frequency domain units are continuous.

Optionally, in the embodiments of the present disclosure, the first resource includes a CSI-RS resource, and the transceiver unit is further configured to send first indication information to the terminal device, where the first indication information is used for determining a valid CSI-RS resource in the CSI-RS resource, and the valid CSI-RS resource includes a CSI-RS resource in the CSI-RS resource that is on a subband and a symbol occupied by the network device.

Optionally, in the embodiments of the present disclosure, the first resource includes a CSI-RS resource, and the transceiver unit is further configured to receive target CSI which is corresponding to the CSI-RS resource and is reported by the terminal device, where the target CSI includes first CSI, the first CSI is CSI obtained according to measurement of a valid CSI-RS resource in the CSI-RS resource, and the valid CSI-RS resource includes a CSI-RS resource in the CSI-RS resource that is on a subband and a symbol occupied by the network device.

Optionally, in the embodiments of the present disclosure, the target CSI includes a preset bit, and the preset bit is used for indicating measurement information corresponding to an invalid CSI-RS resource in the CSI-RS resource; or, the target CSI includes second CSI, and the second CSI is CSI obtained from most recent valid measurement corresponding to an invalid CSI-RS resource in the CSI-RS resource, where the invalid CSI-RS resource includes a CSI-RS resource in the CSI-RS resource that is on a subband or a symbol not occupied by the network device.

Optionally, in the embodiments of the present disclosure, the target CSI includes subband information corresponding to the first CSI.

Optionally, in the embodiments of the present disclosure, the target CSI does not include measurement information of a resource included in a guard band between two adjacent subbands in the at least two subbands.

Optionally, in the embodiments of the present disclosure, the first resource includes a CSI-IM resource, and the transceiver unit is further configured to send second indication information to the terminal device, the second indication information is used for determining a second resource and/or a third resource, the second resource includes a CSI-IM resource in the CSI-IM resource that is on a subband and a symbol occupied by the network device, and the third resource includes a CSI-IM resource in the CSI-IM resource that is on a subband or a symbol not occupied by the network device.

It should be understood that the network device 400 according to the embodiments of the present disclosure may correspond to the network device in the method embodiments of the present disclosure, and the aforementioned and other operation and/or function of each unit in the network device 400 are used to implement the corresponding process of the network device in the method of FIG. 2, which is not elaborated here for simplicity.

Figure 9:
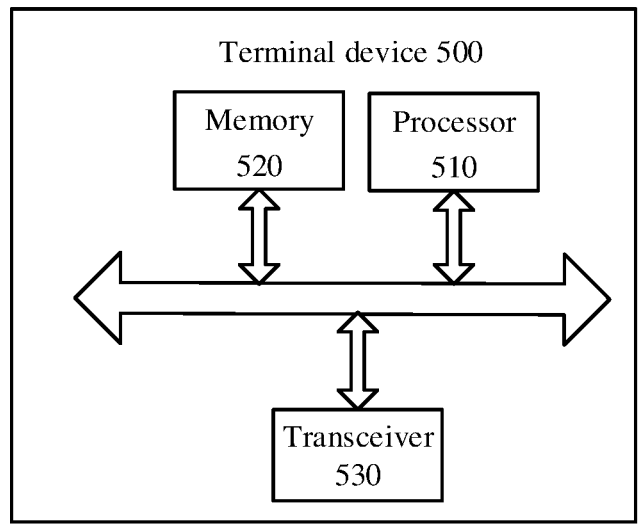
FIG. 9 is another schematic block diagram of a terminal device provided by an embodiment of the present disclosure.

As shown in FIG. 9, an embodiment of the present disclosure also provides a terminal device 500. The terminal device 500 may be the terminal device 300 in FIG. 5, which can be used for performing content of the terminal device corresponding to the methods in FIG. 5 and FIG. 9. The terminal device 500 shown in FIG. 9 includes a processor 510, and the processor 510 may call and run a computer program from a memory to implement the method in the embodiments of the present disclosure.

Optionally, as shown in FIG. 9, the terminal device 500 may also include a memory 520. The processor 510 may call and run a computer program from the memory 520 to implement the method in the embodiments of the present disclosure.

The memory 520 may be one independent device independent of the processor 510, or may be integrated into the processor 510.

Optionally, as shown in FIG. 9, the terminal device 500 may also include a transceiver 530, and the processor 510 may control the transceiver 530 to communicate with other device. Specifically, information or data may be sent to other device, or information or data sent by other device may be received.

The transceiver 530 may include a transmitter and a receiver. The transceiver 530 may further include an antenna, and the number of antenna may be one or more.

Optionally, the terminal device 500 may be the terminal device of the embodiments of the present disclosure, and the terminal device 500 may realize the corresponding process realized by the terminal device in each method of the embodiments of the present disclosure, which is not elaborated here for simplicity.

In one specific implementation manner, the transceiver unit in the terminal device 300 may be realized by the transceiver 530 in FIG. 9. The processing unit in the terminal device 300 may be realized by the processor 510 in FIG. 9.

Figure 10:
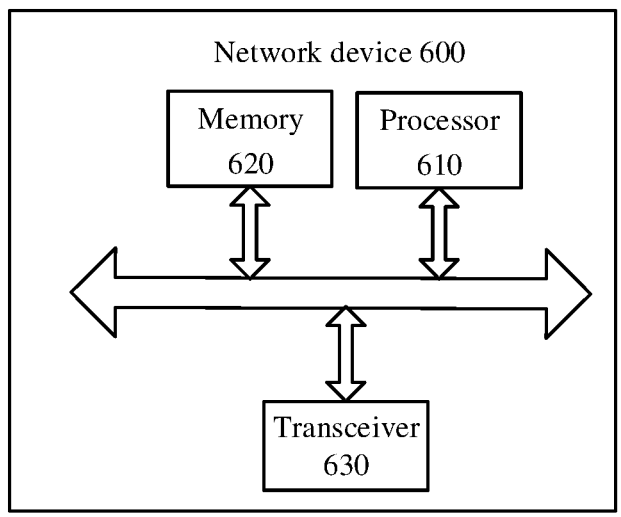
FIG. 10 is another schematic block diagram of a network device provided by an embodiment of the present disclosure.

As shown in FIG. 10, an embodiment of the present disclosure also provides a network device 600. The network device 600 may be the network device 400 in FIG. 6, which can be used for performing content of the network device corresponding to the methods in FIG. 6 and FIG. 9. The network device 600 shown in FIG. 10 includes a processor 610, and the processor 610 may call and run a computer program from a memory to implement the method in the embodiments of the present disclosure.

Optionally, as shown in FIG. 10, the network device 600 may further include a memory 620. The processor 610 may call and run a computer program from the memory 620 to implement the method in the embodiments of the present disclosure.

The memory 620 may be one independent device independent of the processor 610, or may be integrated into the processor 610.

Optionally, as shown in FIG. 10, the network device 600 may further include a transceiver 630, and the processor 610 may control the transceiver 630 to communicate with other device. Specifically, information or data may be sent to other device, or information or data sent by other device may be received.

The transceiver 630 may include a transmitter and a receiver. The transceiver 630 may further include an antenna, and the number of antenna may be one or more.

Optionally, the network device 600 may be the network device of the embodiments of the present disclosure, and the network device 600 may realize the corresponding process realized by network device in each method of the embodiments of the present disclosure, which is not elaborated here for simplicity.

In one specific implementation manner, the transceiver unit in the network device 400 may be realized by the transceiver 630 in FIG. 10.

Figure 11:
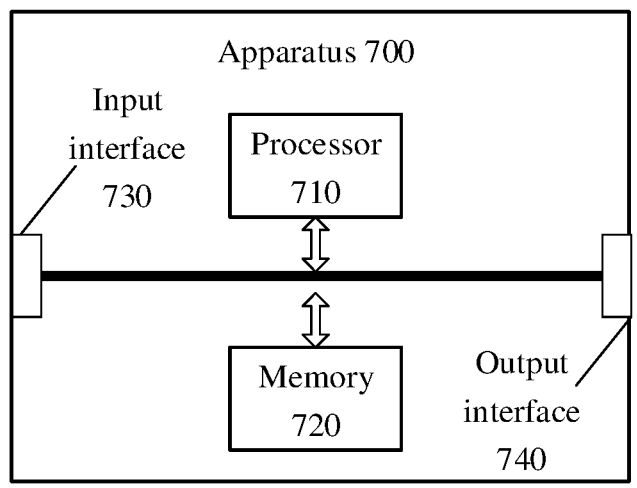
FIG. 11 is a schematic block diagram of an apparatus provided by an embodiment of the present disclosure.

FIG. 11 is a schematic structural diagram of an apparatus according to an embodiment of the present disclosure. The apparatus 700 shown in FIG. 11 includes a processor 710, and the processor 710 may call and run a computer program from a memory to implement the method in the embodiments of the present disclosure.

Optionally, as shown in FIG. 11, the apparatus 700 may further include a memory 720. The processor 710 may call and run a computer program from the memory 720 to implement the method in the embodiments of the present disclosure.

The memory 720 may be one independent device independent of the processor 710, or may be integrated into the processor 710.

Optionally, the apparatus 700 may further include an input interface 730. The processor 710 may control the input interface 730 to communicate with other devices or apparatus. Specifically, information or data sent by other devices or apparatus may be obtained.

Optionally, the apparatus 700 may further include an output interface 740. The processor 710 may control the output interface 740 to communicate with other device or apparatus. Specifically, information or data may be output to other devices or apparatus.

Optionally, the apparatus is applicable to the network device in the embodiments of the present disclosure, and the apparatus may realize the corresponding process realized by network device in each method of the embodiments of the present disclosure, which is not elaborated here for simplicity.

Optionally, the apparatus is applicable to the terminal device in the embodiments of the present disclosure, and the apparatus may realize the corresponding process realized by terminal device in each method of the embodiments of the present disclosure, which is not elaborated here for simplicity.

It should be understood that the apparatus mentioned in embodiments of the present disclosure may also be referred to as a system-level-chip, a system chip, a chip system or a system-on-chip, etc.

Figure 12:
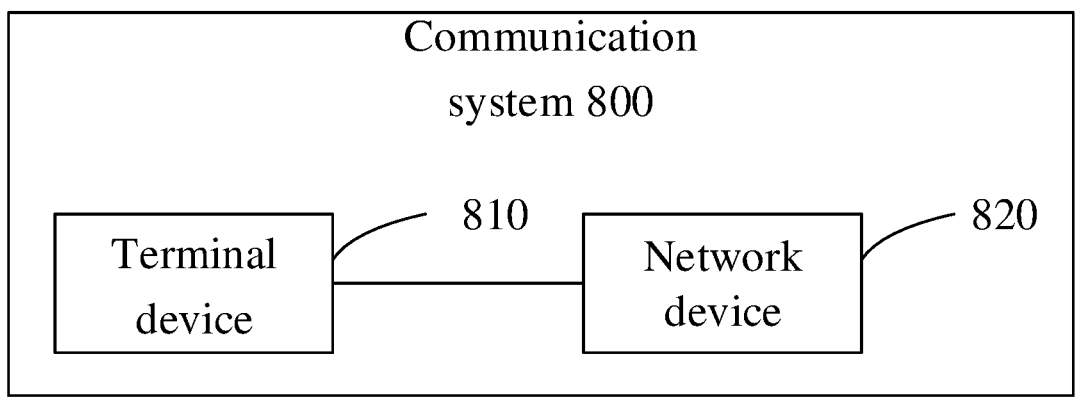
FIG. 12 is a schematic block diagram of a communication system provided by an embodiment of the present disclosure.

FIG. 12 is a schematic block diagram of a communication system provided by an embodiment of the present disclosure. As shown in FIG. 12, the communication system includes a terminal device 810 and a network device 820.

The terminal device 810 may be configured to realize the corresponding functions realized by the terminal device in the foregoing methods, and the network device 820 may be configured to realize the corresponding functions realized by the network device in the foregoing methods, which is not elaborated here for simplicity.

It should be understood that the chip mentioned in embodiments of the present disclosure may also be referred to as a system-level-chip, a system chip, a chip system or a system-on-chip, etc.

It should be understood that the processor of the embodiments of the present disclosure may be a type of integrated circuit chip, with a signal processing capability. In the realization process, each step of the foregoing method embodiments may be completed through integrated logic circuits of hardware or instructions in the form of software in the processor. The foregoing processor may be a general-purpose processor, a Digital Signal Processor (DSP), an Application Specific Integrated Circuit (ASIC), a Field Programmable Gate Array (FPGA) or other programmable logic devices, discrete gates or transistor logic devices, discrete hardware components. Each method, step and logic block diagram disclosed in the embodiments of the present disclosure may be realized or performed. The general-purpose processor may be a microprocessor, or the processor may also be any conventional processor, etc. The steps of the methods disclosed in combination with the embodiments of the present disclosure may be directly completed by a hardware decoding processor, or completed by a combination of hardware and a software module in the decoding processor. The software module may be located in other mature storage medium in the field such as a random access memory, a flash memory, a read-only memory, a programmable ROM or an electrically EPROM, a register or the like. The storage medium is located in the memory, and the processor reads information in the memory so as to complete the steps of the aforementioned methods in conjunction with its hardware.

It may be understood that the memory in the embodiments of the present disclosure may be a volatile memory or a non-volatile memory, or may include both a volatile memory and a non-volatile memory. The nonvolatile memory may be a Read-Only Memory (ROM), a Programmable ROM (PROM), an Erasable PROM (EPROM), an Electrically EPROM (EEPROM) or a flash memory. The volatile memory may be a Random Access Memory (RAM), and it is used as an external cache. Through exemplary but not limitative illustration, many forms of RAM are available, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It should be noted that the memory of the systems and methods described herein is intended to include, but not limited to, these and any other suitable types of memories.

It should be understood that the foregoing memories are exemplary but not limitative illustration. For example, the memory in the embodiments of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM) and a Direct Rambus RAM (DR RAM), etc. That is, the memory in the embodiments of the present disclosure is intended to include, but not limited to, these and any other suitable types of memories.

The embodiments of the present disclosure also provide a computer-readable storage medium for storing a computer program.

Optionally, the computer-readable storage medium is applicable to the communication device in the embodiments of the present disclosure, and the computer program causes a computer to perform the corresponding processes implemented by the mobile terminal/communication device in each method of the embodiments of the present disclosure, which is not elaborated here for simplicity.

The embodiments of the present disclosure also provide a computer program product, including a computer program instruction.

Optionally, the computer program product is applicable to the communication device in the embodiments of the present disclosure, and the computer program instruction causes a computer to perform the corresponding processes implemented by the mobile terminal/communication device in each method of the embodiments of the present disclosure, which is not elaborated here for simplicity.

The embodiments of the present disclosure also provide a computer program.

Optionally, the computer program is applicable to the communication device in the embodiments of the present disclosure. When the computer program is run on a computer, the computer is caused to perform the corresponding processes implemented by the communication device in each method of the embodiments of the present disclosure, which is not elaborated here for simplicity.

Those of ordinary skilled in the art may realize that the unit and algorithm step of each example described in conjunction with the embodiments disclosed herein can be implemented with electronic hardware, or a combination of computer software and electronic hardware. Whether these functions are performed by hardware or software depends on the specific application and design constraint of the technical solution. Professionals may use a different method to realize the described function for each specific application, but such realization should not be considered beyond the scope of the present disclosure.

Those of skilled in the art may clearly understand that for the convenience and simplicity of the description, for the specific working process of the systems, apparatuses and units described above, the corresponding process in the foregoing method embodiments may be referred to, which is not be elaborated here.

In several embodiments provided by the present disclosure, it should be understood that the system, apparatus and method disclosed may be implemented in other manner. For example, the apparatus embodiments described above are merely schematic. For example, said division of the units is only a type of logical function division, and there may be other division manner in actual implementation, for example, a plurality of units or components may be combined or integrated into another system, or some features may be ignored or not performed. On the other hand, a mutual coupling, a direct coupling or a communication connection displayed or discussed may be an indirect coupling or a communication connection through some interfaces, apparatuses or units, and may be electrical, mechanical or in other form.

The unit illustrated as a separate component may or may not be physically separate, and a component displayed as a unit may or may not be a physical unit, i.e. it may be located in one place or may also be distributed onto a plurality of network units. Some or all of the units may be selected according to the actual need to achieve the objective of the solution of the present embodiments.

In addition, each functional unit in each embodiment of the present disclosure may be integrated into one processing unit, or each unit may exist alone physically, or two or more units may be integrated into one unit.

The function may also be stored in a computer-readable storage medium if being realized in the form of a software functional unit and sold or used as an independent product. Based on such understanding, the essence of the technical solution of the present disclosure or the part contributing to the related art or part of the technical solution may be embodied in the form of a software product, and the computer software product is stored in a storage medium including several instructions such that a computer device (which may be a personal computer, a server, or a network device, etc.) executes all or part of the steps of the method described in each embodiment of the present disclosure. The aforementioned storage medium includes a U disk, a mobile hard disk, a Read-Only Memory (ROM), a Random Access Memory (RAM), a magnetic disk or an optical disk and other mediums that can store program codes.

The foregoing descriptions are merely specific implementations of the embodiments of the present disclosure, and the protection scope of the embodiments of the present disclosure is not limited thereto. Any person skilled in the art can easily think of changes or substitutions within the technical scope disclosed in the present disclosure, and all the changes or substitutions should be covered in the protection scope of the present disclosure. Therefore, the protection scope of the present disclosure should be subject to the protection scope of the claims.

What is claimed is:

1. A method for wireless communication, comprising:
receiving, by a terminal device, configuration information of a first resource sent by a network device, wherein the first resource comprises a channel state information reference signal (CSI-RS) resource; and
determining, by the terminal device, the first resource on a first bandwidth part (BWP) according to the configuration information, wherein the first BWP is a BWP on an unlicensed carrier, and the first BWP comprises at least two subbands in a frequency domain;
wherein the first resource comprises the CSI-RS resource, and the method further comprises:
performing, by the terminal device, channel state information (CSI) measurement according to a valid CSI-RS resource in the CSI-RS resource, wherein the valid CSI-RS resource comprises a CSI-RS resource in the CSI-RS resource that is on a subband and a symbol occupied by the network device, and wherein the valid CSI-RS resource is a part of configured CSI-RS resources, and the other part of the configured CSI-RS resources is an invalid CSI-RS resource,
wherein the method further comprises:
receiving, by the terminal device, indication information indicating measurement information corresponding to the invalid CSI-RS resource.

2. The method according to claim 1, wherein the configuration information is used for indicating the first resource on the first BWP.

3. The method according to claim 2, wherein the configuration information is used for indicating the first resource on at least one subband comprised in the first BWP.

4. The method according to claim 2, wherein the configuration information comprises a starting resource block (RB) of the first resource and a number of RB comprised in the first resource on the first BWP.

5. A terminal device, comprising:
a processor and a memory, wherein the memory is configured to store a computer program, and the processor is configured to call and run the computer program stored in the memory so as to:
receive configuration information of a first resource sent by a network device, wherein the first resource comprises a channel state information reference signal (CSI-RS) resource; and
determine the first resource on a first bandwidth part (BWP) according to the configuration information, wherein the first BWP is a BWP on an unlicensed carrier, and the first BWP comprises at least two subbands in a frequency domain;
wherein the first resource comprises the CSI-RS resource, and the processor is further configured to:
perform channel state information (CSI) measurement according to a valid CSI-RS resource in the CSI-RS resource, wherein the valid CSI-RS resource comprises a CSI-RS resource in the CSI-RS resource that is on a subband and a symbol occupied by the network device, and wherein the valid CSI-RS resource is a part of configured CSI-RS resources, and the other part of the configured CSI-RS resources is an invalid CSI-RS resource, wherein the processor is further configured to:
receive indication information indicating measurement information corresponding to the invalid CSI-RS resource.

6. The terminal device according to claim 5, wherein the configuration information is used for indicating the first resource on the first BWP.

7. The terminal device according to claim 6, wherein the configuration information is used for indicating the first resource on at least one subband comprised in the first BWP.

8. The terminal device according to claim 6, wherein the configuration information comprises a starting resource block (RB) of the first resource and a number of RB comprised in the first resource on the first BWP.

9. A network device, comprising:
a processor and a memory, wherein the memory is configured to store a computer program, and the processor is configured to call and run the computer program stored in the memory so as to:
send configuration information of a first resource to a terminal device, wherein the configuration information is used for determining the first resource on a first bandwidth part (BWP) by the terminal device, the first BWP is a BWP on an unlicensed carrier, the first BWP comprises at least two subbands in a frequency domain, and the first resource comprises a channel state information reference signal (CSI-RS) resource;

wherein the first resource comprises the CSI-RS resource, channel state information (CSI) measurement is performed according to a valid CSI-RS resource in the CSI-RS resource, wherein the valid CSI-RS resource comprises a CSI-RS resource in the CSI-RS resource that is on a subband and a symbol occupied by the network device, and wherein the valid CSI-RS resource is a part of configured CSI-RS resources, and the other part of the configured CSI-RS resources is an invalid CSI-RS resource, and the processor is further configured to:

send indication information to the terminal device, wherein the indication information is used for indicating measurement information corresponding to the invalid CSI-RS resource.

10. The network device according to claim 9, wherein the configuration information is used for indicating the first resource on the first BWP.

11. The network device according to claim 10, wherein the configuration information is used for indicating the first resource on at least one subband comprised in the first BWP.

12. The network device according to claim 10, wherein the configuration information comprises a starting resource block (RB) of the first resource and a number of RB comprised in the first resource on the first BWP.

* * * * *